United States Patent [19]
Ogawa et al.

[11] Patent Number: 5,107,977
[45] Date of Patent: Apr. 28, 1992

[54] METHOD OF AND SYSTEM FOR DRAWING OUT TORSION SPRING

[75] Inventors: Masazumi Ogawa; Naoto Takayama, both of Kanagawa, Japan

[73] Assignee: Fuji Photo Film Co., Ltd., Kanagawa, Japan

[21] Appl. No.: 646,048

[22] Filed: Jan. 28, 1991

[30] Foreign Application Priority Data

Jan. 29, 1990 [JP] Japan .................................. 2-18207

[51] Int. Cl.⁵ .............................................. B65G 47/24
[52] U.S. Cl. ..................................... 198/388; 198/416
[58] Field of Search ........................ 198/388, 394, 416

[56] References Cited

U.S. PATENT DOCUMENTS

| | | | |
|---|---|---|---|
| 3,588,993 | 6/1971 | Turner | 198/394 |
| 3,631,960 | 1/1972 | Spuhl | 198/394 |
| 3,752,311 | 8/1973 | Kobusch et al. | 198/388 |
| 4,269,300 | 5/1981 | Spuhl | 198/394 |

Primary Examiner—P. W. Echols
Attorney, Agent, or Firm—Sughrue, Mion, Zinn, Macpeak & Seas

[57] ABSTRACT

A torsion spring has a coil portion and a leg portion extending from the coil portion. A pin is inserted into the coil portion of the torsion spring in a first position so that the torsion spring is supported by the pin for rotation about the pin. The pin is moved to bring the torsion spring to a second position. The leg portion of the torsion spring is caused to abut against a guide member so that the torsion spring is rotated by a predetermined angle about the pin during the movement from the first position to the second position.

4 Claims, 5 Drawing Sheets

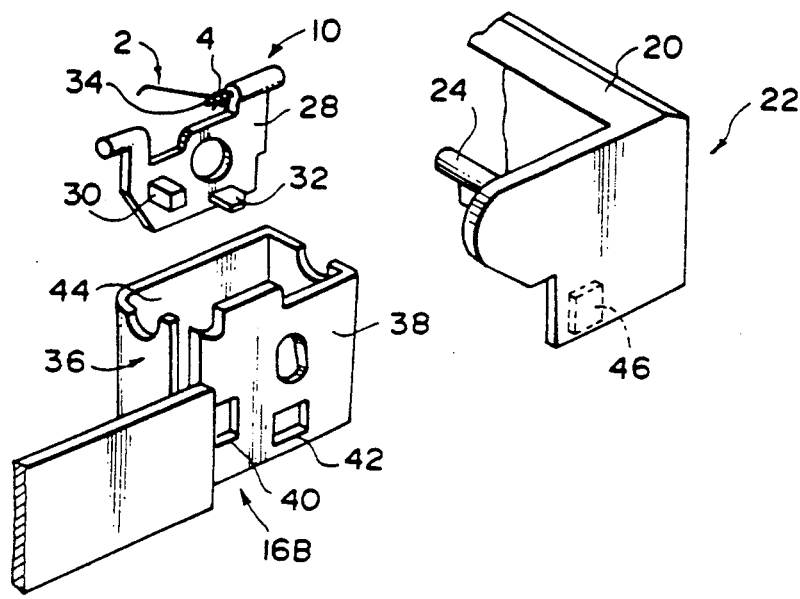
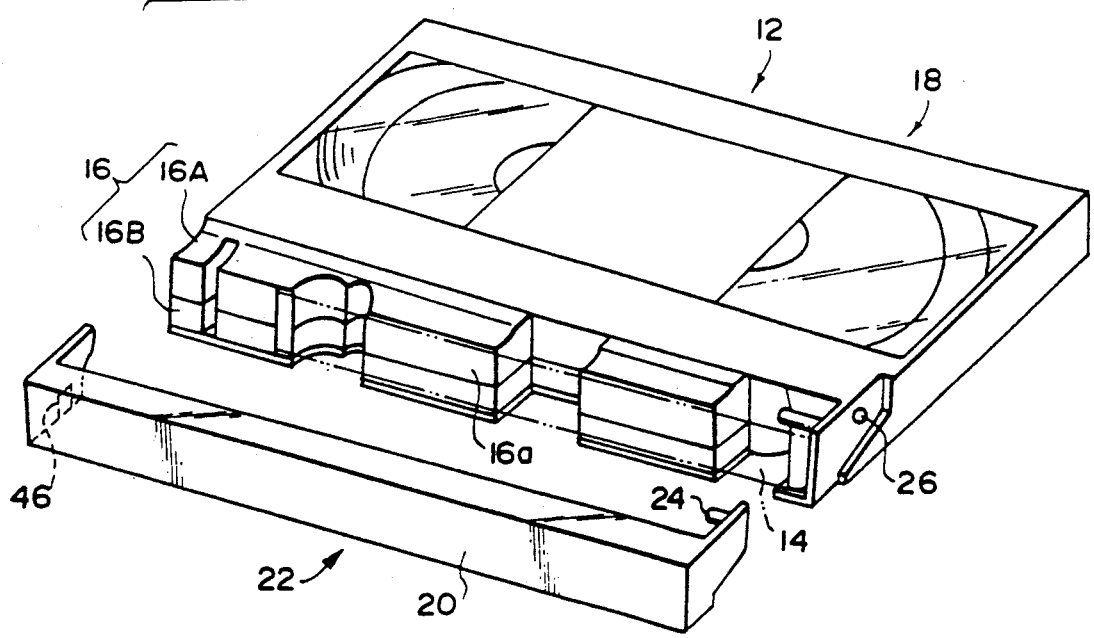

METHOD OF AND SYSTEM FOR DRAWING OUT TORSION SPRING

BACKGROUND OF THE INVENTION

1. Field of the Invention

This invention relates to a method of and a system for drawing a torsion coil from one position to another.

2. Description of the Prior Art

A torsion spring comprising a coil portion and a pair of leg portions extending from opposite end of the coil portion is incorporated in various products such as a videotape cassette. When incorporating the torsion spring into the products by an automated system, the torsion spring must be held in a predetermined attitude which is determined by the structure of the portion into which the torsion spring is incorporated.

Conventionally, a torsion spring which has been fed to a predetermined position is once drawn to a waiting position while kept in the attitude in which it has been held in the predetermined position, and the attitude of the torsion spring is changed while it is transferred to a predetermined position in the product.

For example, a torsion spring for a certain type of videotape cassette is incorporated into the cassette in the following procedure. That is, as shown in FIG. 5, a feed device 100 feeds a torsion spring 2 to a first waiting position where the torsion spring 2 abuts against a stopper 102 which is spring-urged downward. A drawing mechanism 108 has a pair of drawing chucks 106 each having a pin 104 as shown in FIG. 6. The drawing chucks 106 are moved toward each other as shown by arrows A and inserted into the coil portion 4 of the torsion spring 2. Then the chucks 106 are moved in the direction of arrow B in FIG. 5 to bring the torsion spring 2 to a second waiting position shown by broken line in FIG. 5. Then a transfer chuck 112 of a transfer mechanism 110 pinches the coil portion 4 and lifts upward the torsion spring 2, and then the transfer chuck 112 is rotated in the direction of arrow C by a predetermined angle, thereby holding the torsion spring 2 in a predetermined attitude in which it is to be incorporated into the cassette as shown in FIG. 7.

When the torsion spring 2 is fed to the first waiting position by the feeding device 100, the coil portion 4 of the torsion spring 2 is slid along the top surface of a linear feeder 114 with leg portions 6A and 6B suspended downward from the top surface on opposite sides thereof. Further, the drawing mechanism 108 draws the torsion spring 2 with the leg portions 6A and 6B suspended downward from the drawing chucks 106.

In the conventional system, the attitude of the torsion spring 2 is changed by rotation of the transfer chuck 112. Accordingly, the transfer mechanism 110 must be provided with a mechanism for rotating the transfer chuck 112, which complicates the structure of the transfer mechanism 110 and adds to the weight of the same, thereby preventing the torsion spring 2 from being incorporated at high speed.

SUMMARY OF THE INVENTION

In view of the foregoing observations and description, the primary object of the present invention is to provide a method of drawing a torsion coil from one position to another which permits the torsion spring to be incorporated into a product at high speed.

Another object of the present invention is to provide a system for carrying out the method.

In accordance with the present invention, the leg portion of the torsion spring is caused to abut against a guide member and to rotate by a predetermined angle to an attitude in which it is to be incorporated into a product when the torsion spring is drawn from one position to another.

That is, in accordance with one aspect of the present invention, there is provided a method of drawing a torsion spring, which has a coil portion and a leg portion extending from the coil portion, from a first position to a second position comprising the steps of inserting a pin into the coil portion of the torsion spring in the first position so that the torsion spring is supported by the pin for rotation about the pin, moving the pin to bring the torsion spring to the second position, and causing the leg portion of the torsion spring to abut against a guide member so that the torsion spring is rotated by a predetermined angle about the pin during the movement from the first position to the second position.

In accordance with another aspect of the present invention, there is provided a system for drawing a torsion spring, which has a coil portion and a leg portion extending from the coil portion, from a first position to a second position comprising a drawing mechanism which has a pin whose diameter is smaller than the inner diameter of the coil portion of the torsion spring, inserts the pin into the coil portion of the torsion spring in the first position so that the torsion spring is supported by the pin for rotation about the pin and moves the pin to bring the torsion spring to the second position, and a guide member which abuts against the leg portion of the torsion spring when the torsion spring is brought to the second position from the first position and causes the torsion spring to rotate by a predetermined angle about the pin.

With this arrangement, the torsion spring is held in an attitude ready for subsequent incorporation into a desired product at the time when it is drawn to the second position. Accordingly, the mechanism for incorporating the torsion spring into the product need not be provided with changing the attitude of the torsion spring, whereby it may be simple in structure and small in weight.

BRIEF DESCRIPTION OF THE DRAWINGS

FIG. 3 is a schematic perspective view showing a manner in which the lock plate carrying thereon the torsion spring is incorporated into the cassette body, FIG. 4 is a perspective view showing a videotape cassette in which the torsion spring and the lock plate have been incorporated.

DESCRIPTION OF THE PREFERRED EMBODIMENT

Figure 5:
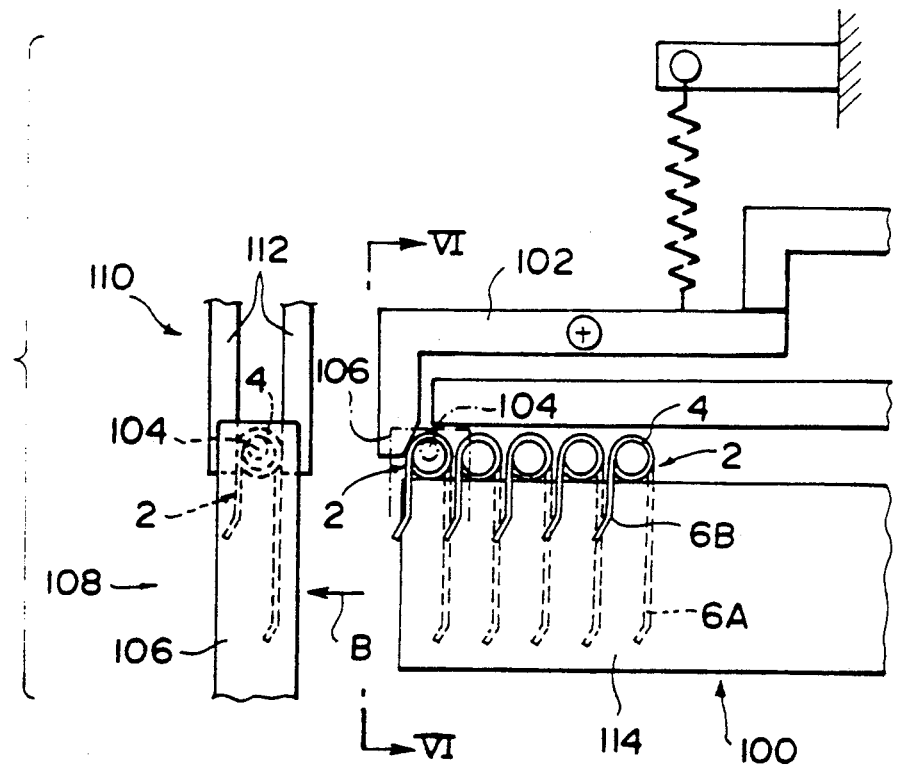
FIG. 5 is a view similar to FIG. 1 but showing a conventional system.
Figure 6:
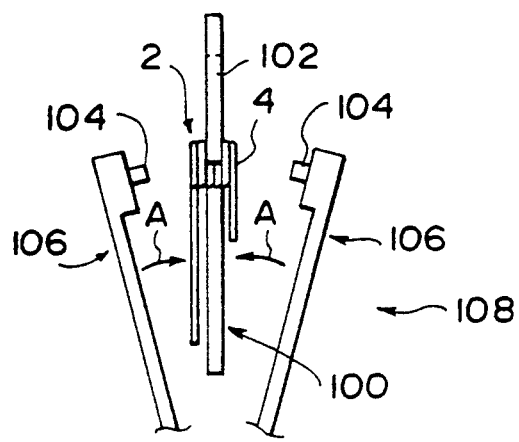
FIG. 6 is a view as viewed in the direction shown by line VI—VI in FIG. 5.
Figure 7:
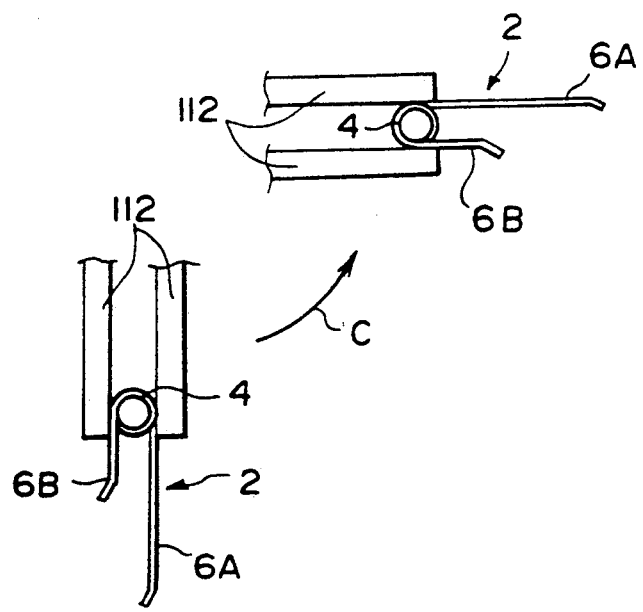
FIG. 7 is a view for illustrating a drawback of the conventional system.
Figure 8:
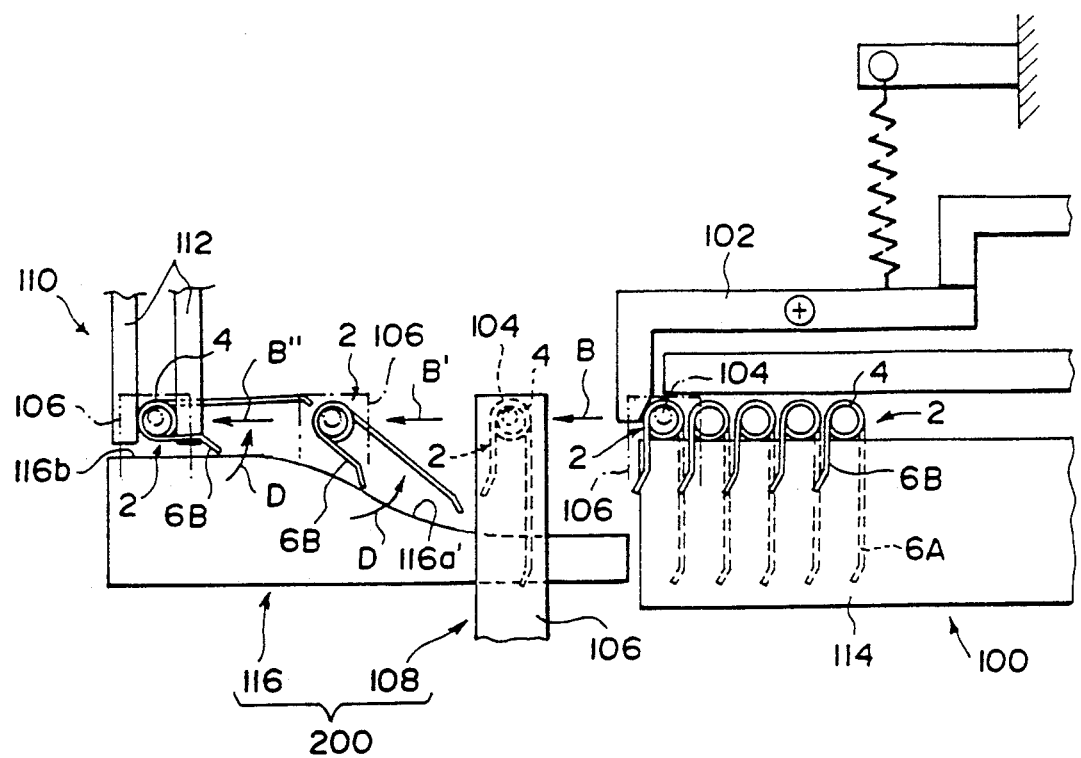
FIG. 8 is a view similar to FIG. 1 but showing a modification the system shown in FIG. 1.

A torsion spring incorporating system which is for incorporating a torsion spring into a videotape cassette and is provided with a system for drawing a torsion spring in accordance with an embodiment of the present invention will be described with reference to FIGS. 1 to 4. In FIGS. 1 to 4 the parts analogous to the parts shown in FIGS. 5 to 7, for illustrating the prior art, are given the same reference numerals and will not be described here.

Figure 1:
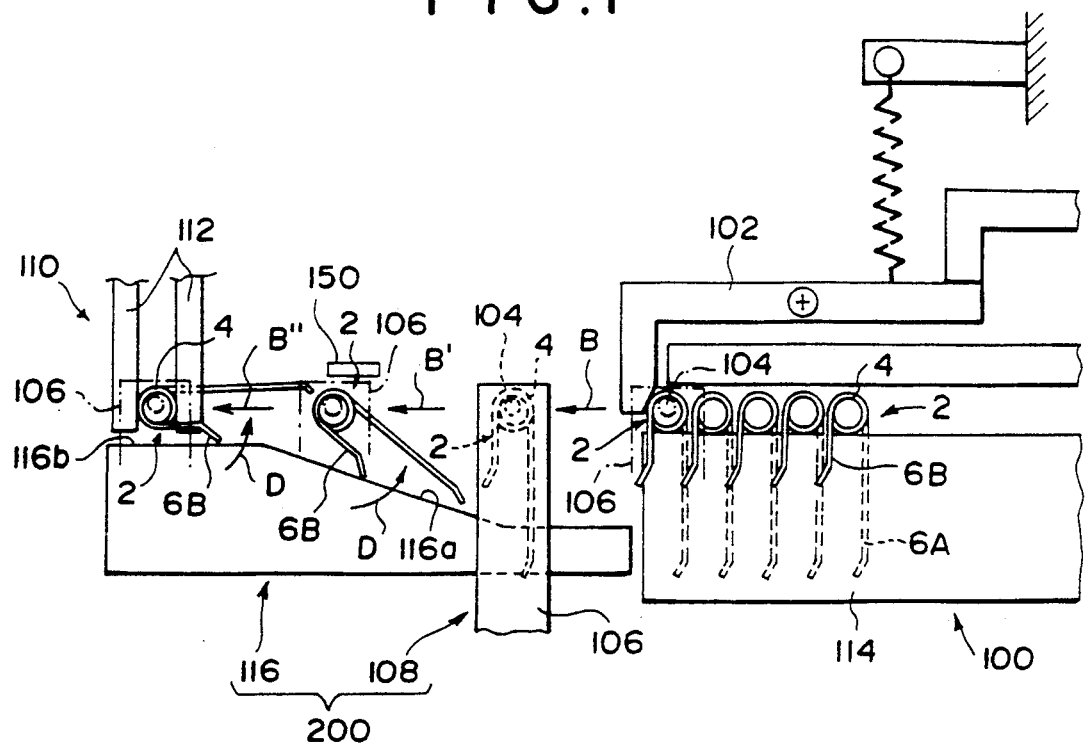
FIG. 1 is a schematic view showing an embodiment of the present invention.

In FIG. 1, a plurality of torsion springs 2 are fed by a feeding device 100 to a drawing waiting position in which each waits to be drawn. When the torsion spring 2 is fed to the drawing waiting position, the coil portion 4 of the torsion spring 2 is slid along the top surface of a linear feeder 114 with leg portions 6A and 6B suspended downward from the top surface on opposite sides thereof. A pair of drawing chucks 106 of a drawing mechanism 108 move toward each other and pins 104 on the respective chucks 106 are inserted into the coil portion 4 of the torsion spring 2 in the drawing waiting position. Then the drawing mechanism 108 moves the drawing chucks 106 in the direction of arrow B, in the direction of arrow B' and then in the direction of arrow B" to a transfer waiting position in which it waits to be transferred.

The diameters of the pins 104 are smaller than the inner diameter of the coil portion 4 of the torsion spring 2 and accordingly, when the torsion spring 2 is moved to the transfer waiting position, the torsion spring 2 is suspended from the chucks 106 to be rotatable about the pins 104. A guide member 116 is provided between the drawing waiting position and the transfer waiting position. The guide member 116 has an inclined top surface 116a which ascends toward the transfer waiting position and a horizontal top surface 116b which extends from the upper end of the inclined top surface 116a toward the transfer waiting position. When the torsion spring 2 is drawn to the transfer waiting position, the shorter leg portion 6B which is positioned forward of the other leg portion during movement to the transfer waiting position slides along the inclined top surface 116a and when the torsion spring 2 reaches the transfer waiting position, the shorter leg portion 6B rests on the horizontal top surface 116b, whereby the torsion spring 2 is rotated in the direction of arrow D. The height of the horizontal top surface 116b has been set so that the torsion spring 2 is held in a predetermined attitude when the shorter leg portion 6B rests thereon.

When the drawing chucks 106 are moved to the transfer waiting position at an excessively high speed, the torsion spring 2 can be rotated beyond the predetermined attitude. In order to prevent this, a stopper 150 which abuts against the torsion spring 2 when it is rotated by an excessively large angle is provided above the inclined top surface 116a of the guide member 116.

That is, in this particular embodiment, the drawing mechanism 108, the guide member 116 and the stopper 150 form the system 200 for drawing a torsion spring.

Figure 2:
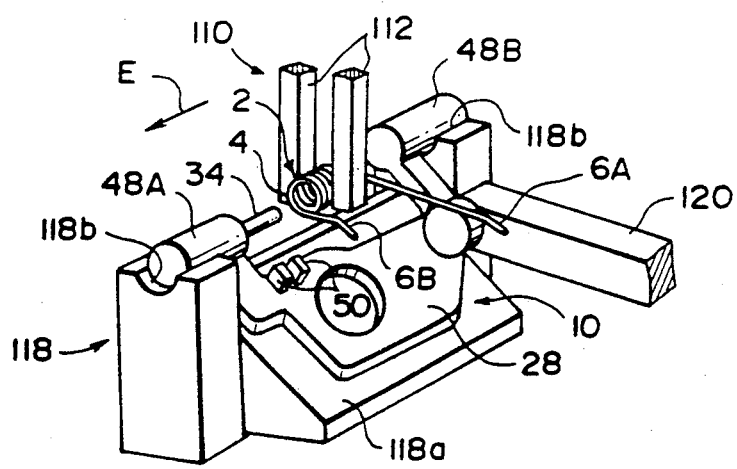
FIG. 2 is a schematic perspective view showing the system for incorporating the torsion spring drawn out by the system shown in FIG. 1 into the lock plate.

When the torsion spring 2 is moved to the transfer waiting position, a transfer chuck 112 of a transfer mechanism 110 is moved downward and catches the torsion spring 2 by the coil portion 4 and transfers the torsion spring 2 from the transfer waiting position. Then the torsion spring 2 is incorporated into a lock plate 10 as shown in FIG. 2, and then the lock plate 10 carrying thereon the torsion spring 2 is incorporated into the videotape cassette 12 (FIG. 4).

As shown in FIG. 4, the videotape cassette 12 has a cassette body 18 which comprises a casing 16 formed of upper and lower halves 16A and 16B and a magnetic tape 14 accommodated in the casing 16. The casing 16 has an end face 16a along which the magnetic tape 14 runs, and a guard panel having a guard portion which is parallel to the end face 16a is mounted on the casing 16. The guard panel 22 is supported for rotation on the casing 16 by a pair of pivot pins 24 which are respectively inserted into holes 26 formed on the respective sides of the casing 16 and is movable between a closed position in which it covers the magnetic tape 14 on the end face 16a and an open position in which it uncovers the magnetic tape 14.

The lock plate 10 locks the guard panel in the closed position when the videotape cassette 12 is not used. As shown in FIG. 3, the lock plate 10 comprises a body portion 28, first and second projections 30 and 32 which project substantially in perpendicular to the body portion 28 and a shaft portion 34 which is formed integrally with the body portion 28 to extend horizontally. The coil portion 4 of the torsion spring 2 is fit on the shaft portion 34 of the lock plate 10, and the lock plate 10 carrying thereon the torsion spring 4 is mounted in a lock plate mounting portion 36 formed in the lower half 16B near one side thereof. The lock plate mounting portion 36 has outer and inner side wall portions 38 and 44. The outer side wall portion 38 is provided with a pair of openings 40 and 42. The lock plate 10 is mounted in the lock plate mounting portion 36 with the projections 30 and 32 inserted into the openings 40 and 42. The torsion spring 2 on the shaft portion 34 is placed s that the shorter leg portion 6B abuts against the rear surface of the body portion 28 of the lock plate 10 (the surface opposite to the surface from which the projections 30 and 32 project) and the longer leg portion 6A abuts against the inner side surface 44 of the lock plate mounting portion 36, whereby the projections 30 and 32 are urged outward. The guard panel 22 has a recess 46 which is adapted to engage with the projection 32 of the lock plate 10. When the projection 32 is in engagement with the recess 46, the guard panel 22 is prevented from moving to the open position from the closed position.

The projection 30 is exposed outside, and when the cassette 12 is loaded in a videotape recorder or the like, a member of the recorder pushes inward the projection 30 to disengage the projection 32 from the recess 46, thereby releasing the guard panel 22.

The torsion spring 2 is incorporated into the lock plate 10 by the use of a jig 118 shown in FIG. 2.

The jig 118 has a slant 118a which is inclined by a predetermined angle with respect to the horizon and a pair of semi-cylindrical recesses 118b for supporting support shaft portions 48A and 48B of the lock plate 10. The lock plate 10 is placed on the jig 118 with the rear face of the body portion 28 lying on the slant 118a and the support shaft portions 48A and 48B resting on the recesses 118b, and fixed there by a retainer lever 120. Then tee transfer chuck 112 of the transfer mechanism 110 moves in translation from the transfer waiting position to a position in which the coil portion 4 of the torsion spring 2 held by the chuck 112 is in alignment with the shaft portion 34, and moves toward the shaft portion 34 (in the direction of arrow E), thereby fitting the coil portion 4 on the shaft portion 34. Thereafter, the chuck 112 releases the torsion spring 2. When the torsion spring 2 is released, the leg portions 6A and 6B rotate downward under the gravity, and the shorter leg portion 6B abuts against the body portion 28 of the lock plate 10 between a pair of locator projections 50. The chuck 112 moves upward after it releases the torsion spring 2 and then returns to the transfer waiting position.

When the transfer chuck 112 is in the position shown in FIG. 2, the leg portions 6A and 6B are positioned substantially horizontally. Accordingly, they do not interfere with the locator projections 50 when the transfer chuck 112 moves toward the shaft portion 34.

As can be understood from the description above, in this embodiment, the torsion spring 2 is drawn out by inserting the pins 104 of the drawing chucks 106 into the coil portion 4 of the torsion spring 2 which is in the drawing waiting position, and then moving the drawing chucks 106. While the torsion spring 2 is drawn out, the torsion spring 2 is held to be rotatable about the pins 104 and the shorter leg portion 6B is caused to abut against the guide member 116 so that the torsion spring 2 is rotated to a predetermined attitude. Accordingly, when the torsion spring 2 is drawn to the transfer waiting position, the torsion spring 2 has been in the predetermined attitude in which it is to be fitted on the shaft portion 34 of the lock plate 10. Therefore, the transfer mechanism 110 need not be provided with a mechanism for rotating the transfer chuck 112, whereby the transfer mechanism 110 can be simplified and can be reduced in weight and the torsion spring 2 can be incorporated into the lock plate 10 at high speed.

Further, in this embodiment, the stopper 150 prevents the torsion spring 2 from rotating by an excessively large angle when the torsion spring 2 is drawn at high speed, whereby permitting incorporation of the torsion spring 2 at further higher speed.

Instead of providing the stopper 150, the guide member 116 may be provided with a curved slant 116a' which smoothly merges into the horizontal top surface 116b. With this arrangement, the counterforce of the guide member 116 acting on the torsion spring 2 cannot be excessively large and the torsion spring 2 is prevented from rotating by an excessively large angle.

In the embodiment described above, the feeding device 100 for feeding the torsion springs 2 to the drawing waiting position is a linear vibrating feeder. However it may be other various feeders so long as it can feed a plurality of torsion springs arranged in a row one by one. Further, though, in the embodiment described above, the guide member 116 is fixed, the whole or a part of the guide member 116 may be moved by a drive means such as an air cylinder in the case where the shape of the transfer chuck 112 is such as to interfere with the guide member 116.

We claim:

1. A method of drawing a torsion spring, which has a coil portion and a leg portion extending from the coil portion, from a first position to a second position comprising the steps of inserting a pin into the coil portion of the torsion spring in the first position so that the torsion spring is supported by the pin for rotation about the pin, moving the pin to bring the torsion spring to the second position, and causing the leg portion of the torsion spring to abut against a guide member so that the torsion spring is rotated by a predetermined angle about the pin during the movement from the first position to the second position.

2. A system for drawing a torsion spring, which has a coil portion and a leg portion extending from the coil portion, from a first position to a second position comprising a drawing mechanism which has a pin whose diameter is smaller than the inner diameter of the coil portion of the torsion spring, inserts the pin into the coil portion of the torsion spring in the first position so that the torsion spring is supported by the pin for rotation about the pin and moves the pin to bring the torsion spring to the second position, and a guide member which abuts against the leg portion of the torsion spring when the torsion spring is brought to the second position from the first position and causes the torsion spring to rotate by a predetermined angle about the pin.

3. A system as defined in claim 2 further comprising a stopper member which abuts against the torsion spring when the torsion spring rotates beyond the predetermined angle, thereby preventing the torsion spring from rotating by an excessively large angle.

4. A system as defined in claim 2 in which the surface of the guide member which abuts against the leg portion is curved so that rotation of the torsion spring beyond the predetermined angle is prevented.

* * * * *